March 31, 1970  HIDEO MORI  3,503,660

BEARING

Filed April 12, 1968  3 Sheets-Sheet 1

March 31, 1970  HIDEO MORI  3,503,660

BEARING

Filed April 12, 1968

March 31, 1970   HIDEO MORI   3,503,660
BEARING
Filed April 12, 1968   3 Sheets-Sheet 3
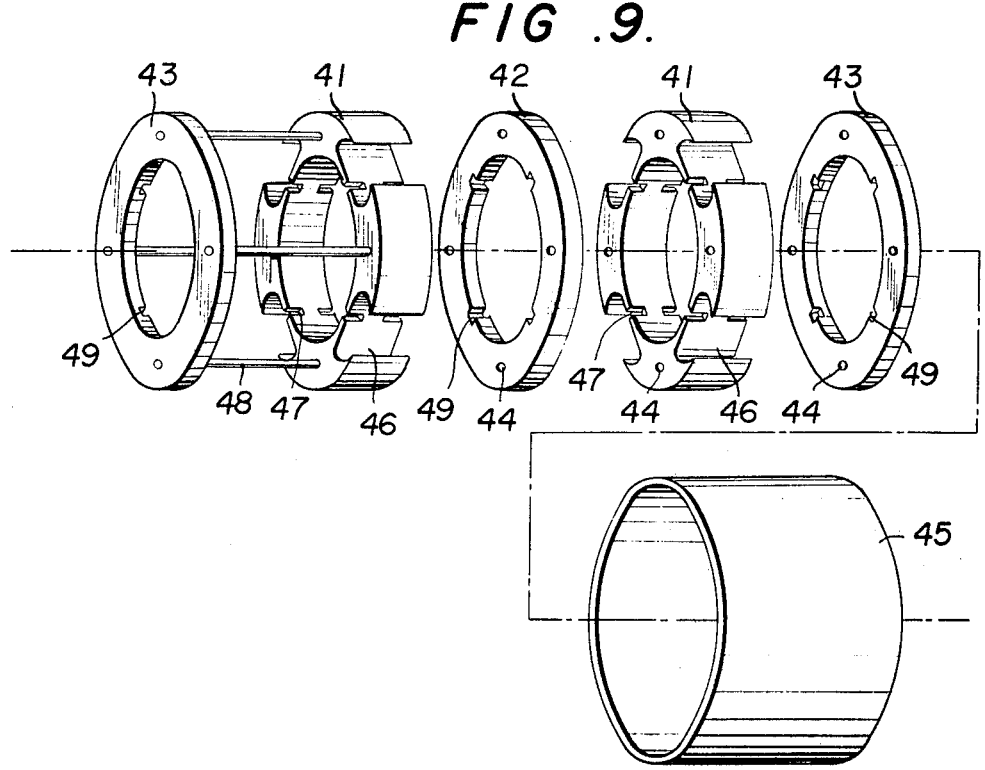
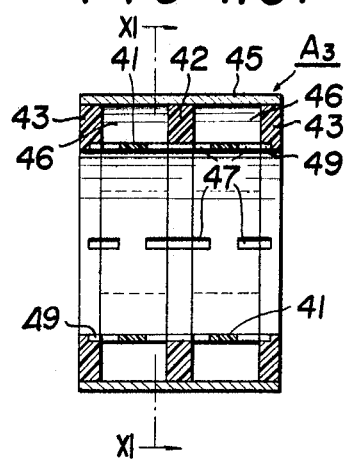
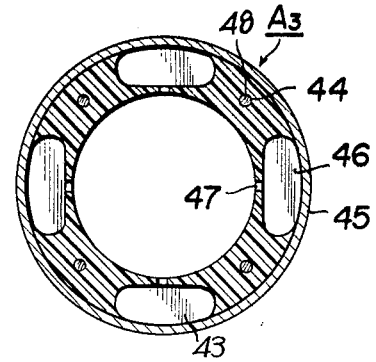

United States Patent Office 3,503,660
Patented Mar. 31, 1970

3,503,660
BEARING
Hideo Mori, 317 3-chome, Nishiawaji-cho, Higashiyodo-gawa-ku, Osaka-shi, Osaka-fu, Japan
Filed Apr. 12, 1968, Ser. No. 720,933
Claims priority, application Japan, Sept. 29, 1967, 42/62,300
Int. Cl. F16c 33/66
U.S. Cl. 308—121                 3 Claims

ABSTRACT OF THE DISCLOSURE

A bearing being provided with oil reservoirs around the center shaft hole, said oil reservoirs are led to the inner contact surface of said shaft hole through small openings such as slits and the like, and thus the lubricating oil contained in said oil reservoirs can be supplied onto the contact surfaces of the shaft and shaft hole properly and continuously for a long-term operation.

---

The present invention relates to an improved bearing, and particularly to a self-lubricating or self-oil-supplying plastic bearing.

Synthetic plastic bearings are usually made of nylon, polycarbonate, polypropylene and the like, having smooth and slippery surfaces. The bearing made of these materials can be employed without any lubricants for their proper characteristics, however, for severe, precise, stable and long-term operations as in the following, the plastic bearing is also desirable to be lubricated. That is:

(1) In a low torque operation.
(2) In an operation requiring specially even torque and rotation.
(3) In a noiseless operation.
(4) In a precise mechanism avoiding any play of the axle due to abrasion.
(5) In the case of avoiding frictional heat of the bearing, as the coefficient of linear expansion of synthetic plastic material is high.
(6) In a severe operation beyond the limit of non-lubricating operation.

Accordingly, the main object of the present invention is to provide a bearing which supplies lubricating oil by itself, continuously, constantly and properly.

A further object of the present invention is to provide a bearing which has oil reservoirs containing lubricants around the bearing surface. Said lubricants such as oil, grease and the like contained in said reservoirs are led onto the contact surfaces of the shaft and the bearing surface of the bearing hole, and thus a superior and long-term lubrication of the bearing can be attained.

A further object of the present invention is to provide a self-lubricating bearing which has oil reservoirs, in which porous materials containing liquid lubricant are stuffed, said lubricant in the reservoirs flowing out little by little to the bearing surface, whereby a superior and long-term lubrication of the bearing can be attained.

In accordance with the present invention, multiple bearings can be formed as a unit bearing by combining a plurality of the above-mentioned bearings.

Further objects and features of the present invention will be more clearly understood from the following description of several embodiments thereof taken in conjunction with the accompanying drawings in which:

FIG. 9 is a perspective constructional view of another embodiment of the combined bearing which is different from the bearing shown in FIGS. 6 to 8, inclusive;

FIG. 10 is a vertical sectional side view of said combined bearing shown in FIG. 9 which is assembled as one unit; and FIG. 11 is a vertical sectional front view of said combined bearing shown in FIGS. 9 and 10, which is taken on the line XI—XI in FIG. 10.

Figure 1:
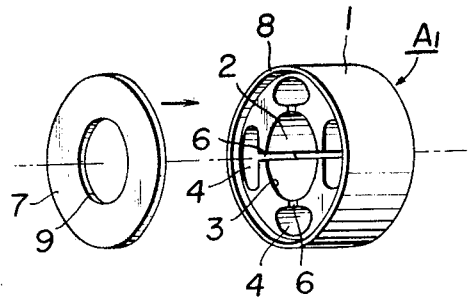
FIG. 1 is a perspective view of an embodiment of the bearing of the present invention.
Figure 2:
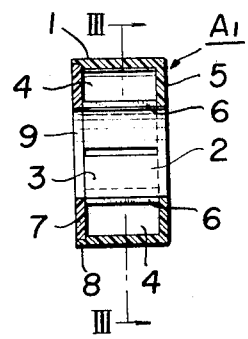
FIG. 2 is a vertical sectional side view of said bearing which is assembled.
Figure 3:
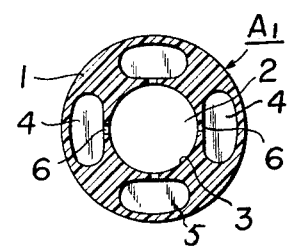
FIG. 3 is a vertical sectional front view of said bearing which is taken on the line III—III in FIG. 2.

Now referring to the first embodiment of the present invention shown in FIGS. 1 to 3, inclusive, the notation $A_1$ indicates a synthetic plastic bearing of the present invention, and the numeral 1 indicates a bearing body. Said bearing body 1 is made of heat resisting, hard, stiff, smooth and slippery synthetic plastic such as nylon, polycarbonate, polypropylene, polyphenylene oxide, polyacetal, acrylonitrile-butadiene-styrene resin, and the like. As shown in the figures, said bearing body 1 is provided with a center shaft hole 2, and cavities 4 are provided nearby and around the bearing surface 3 of the bearing hole 2. Said cavities 4 may be two or more, and are arranged around the bearing surface 3 at regular intervals, and in the embodiment shown in the figures, four cavities are provided. Further, said cavities 4 extend in the direction of the shaft to be inserted through the shaft hole 2, and one side of said cavities 4 is closed by wall portions 5 of the bearing body 1, while the other side of the cavities 4 is open. The open side of the cavities 4 is closed with a ring cover 7 in place of said wall portions 5 by inserting said ring cover 7 into a flange 8 as shown with an arrow in FIG. 1. Each of said cavities 4 opens into said shaft hole 2 through a slot 6 which is engraved through the wall between the shaft hole 2 and each cavity 4. Said ring cover 7 is made of the same material as that of the bearing body 1, and is also provided with a shaft hole 9 at the center.

In order to attain the self-lubricating action of the bearing $A_1$ having the above-mentioned structure, a porous material such as felt, other fibrous materials, non-woven fabrics, spongy materials or the like is stuffed into said cavities 4, and said stuffed porous material is supplied with grease or liquid lubricating oils. When grease is employed as a lubricant, said porous materials can be omitted.

Figure 4:
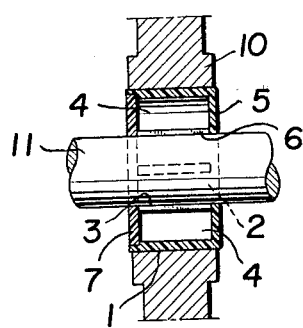
FIG. 4 is a vertical sectional side view of said bearing which is mounted in a housing.
Figure 5:
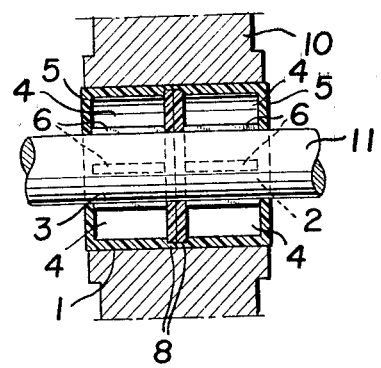
FIG. 5 is a vertical sectional side view of a combined double bearing which is mounted in a housing as one unit.

The improved plastic bearing $A_1$ is mounted in a housing 10 as shown in FIG. 4, or two or more bearings are mounted in a housing 10 as one unit as shown in FIG. 5. The number of the bearings in the housing and the means to mount the bearings will be selected at will in accordance with the objects and conditions of the bearings to be employed. A shaft 11 is inserted through the shaft hole 2 of the bearing body 1, and when the shaft 11 is rotated, the grease or liquid lubricant contained in the cavities 4 flows out little by little onto the surface of the shaft 11 through the slots 6, whereby lubrication of the contact surfaces of the bearing is carried out. In this instance, the grease or the oiled porous material being contained in the cavities 4 does not directly contact the shaft 11, therefore, an excess supply of the lubricant can be avoided and long-term lubrication can be attained.

Figure 6:
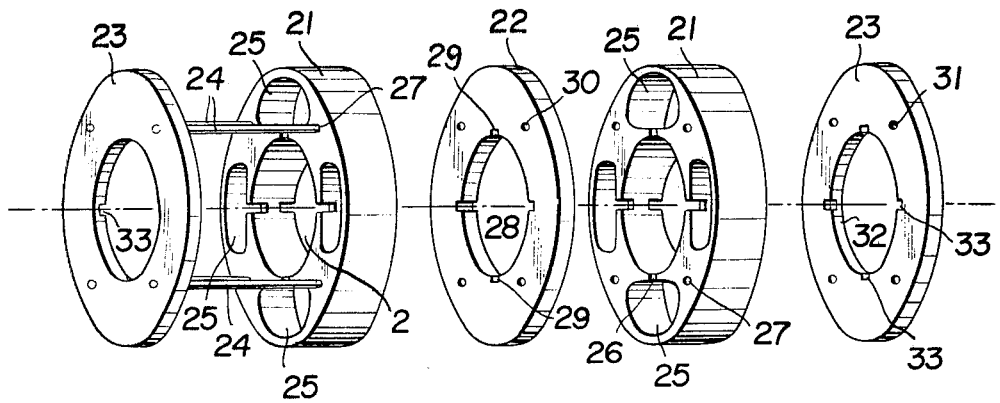
FIG. 6 is a perspective constructional view of an embodiment of the combined bearing of the present invention.
Figure 7:
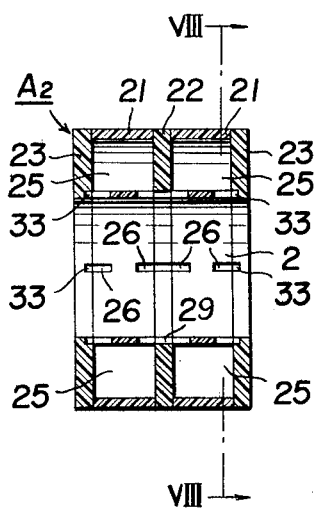
FIG. 7 is a vertical sectional side view of said combined bearing shown in FIG. 6 which is assembled as one unit.
Figure 8:
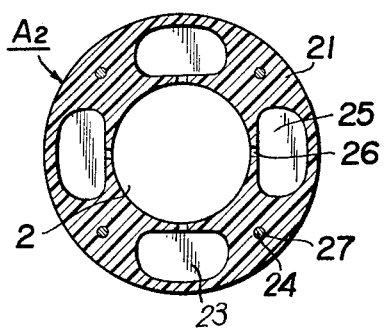
FIG. 8 is a vertical sectional front view of said combined bearing which is taken on the line VIII—VIII in FIG. 7.

Referring further to the second embodiment of the present invention shown in FIGS. 6 to 8, inclusive, the notation $A_2$ indicates another bearing which comprises a plurality of bearing bodies 21, intermediate rings 22, ring covers 23 and connecting pins 24, said bearing bodies 21, intermediate rings 22 and ring covers 23 being made of the same materials as those of the aforementioned bearing $A_1$. The embodiment shown in FIGS. 6 to 8 is composed of two bearing bodies 21, one intermediate ring 22, two ring covers 23 and four connecting pins 24. As shown in the figures, the bearing body 21 is a disc of an appropriate thickness having a shaft hole 2 at the center thereof, and being provided with a plurality of cavities 25 around the shaft hole 2 at regular intervals as the aforementioned cavities 4, the effects and features of said cavities 25 being the same as those of the cavities 4. The cavities 25 open into the shaft hole 2 through slots 26. Between said cavities 25, two or more small holes 27 of said connecting pins 24 are cut symmetrically. The intermediate ring 22 is sandwiched between the bearing bodies 21 as illustrated in the figures and is in the shape of a relatively thin ring. Further ring 22 is provided with slots 29 on the inner surface 28 at the corresponding positions with said slots 26, and small holes 30 are also cut through it at the corresponding positions with the holes 27 of the bearing body 21.

Two ring covers 23 are attached to the both sides of the combination of said bearing bodies 21 and intermediate ring 22 in order to prevent the grease or the lubricant contained in said cavities 25 from leaking outside of the bearing. Said ring cover 23 also has a shaft hole and is provided with inserting holes 31, for the connecting pins 24 at the corresponding positions with those of the bearing bodies 21 and intermediate ring 22. Said holes 31 may be blind holes or perforations. Further, small grooves 33 are engraved on the inner surface 32 of the ring 23 at the corresponding positions of the slot 26 of the bearing bodies 21.

So as to obtain the combined bearing $A_2$ comprising bearing bodies 21, intermediate rings 22 and ring covers 23, the bearing bodies 21 and the intermediate rings 22 are assembled in turn, and the both sides of the combined bearing bodies are covered by the ring covers 23, in the meantime, the connecting pins 24 are inserted through the holes 27, 30 and 31. This bearing $A_2$ can be varied in length along its axis by appropriately selecting the number of the bearing bodies 21 and the intermediate rings 22 employed, therefore, it will be applicable for various services.

The lubricating action of the bearing $A_2$ is the same as that of the aforementioned bearing $A_1$, that is, the grease or the lubricant in the cavities 25 is supplied onto the bearing surfaces through slots 26, 29 and 33.

The third embodiment of the present invention, the bearing $A_3$, resembles the bearing $A_2$ excepting that the bearing $A_3$ is provided with an outer sleeve, as shown in FIGS. 9, 10 and 11, inclusive. In the figures, the bearing $A_3$ is composed of bearing bodies 41, an intermediate ring 42, ring covers 43, connecting pins 48 and an outer sleeve 45, in which said outer sleeve may be made of metal or plastic. The bearing bodies 41 are doughnut-like rings having a shaft hole at the center as shown in the figures, and being provided with cavities 46 around said shaft hole at regular intervals. Said cavities 46 are opened at the outer peripehry of the bearing body 41 and in communication with the inner shaft hole through slots 47. Therefore, the cavities 46 can be made larger than the aforementioned cavities 25 in the bearing $A_2$, accordingly, the quantities of the lubricant contained in the cavities 46 can be increased.

The combined bearing unit $A_3$ is assembled by the steps, as in the aforementioned second embodiment $A_2$, i.e. the bearing bodies 41 are combined putting the intermediate ring 42 between them, while the connecting pins 48 are thrust into the holes 44, and the ring covers 43 are attached onto both sides of the combined bearing bodies, which are then fitted into said outer sleeve 45. The lubricant contained in the cavities 46 is supplied to the bearing surface in the same manner as the aforementioned embodiments. Further, the intermediate ring 42 and the ring covers 43 are also provided with slots 49 at the corresponding positions of said slots 47 as those of the former embodiment. Further by reason of said sleeve 45, the opening of the cavities 46 are closed, preventing the lubricant from leaking while at the same time the strength of the bearing combination is increased.

The length along the axis of the combined bearing $A_3$ can be varied as was the aforementioned second embodiment $A_2$.

Though not being shown in the drawings, the ring covers 2, 23 and 43 may also be provided with cavities as the bearing bodies at the corresponding positions, and reinforcement stays may be provided in the cavities.

It should be emphasized, however, that the specific embodiments described and shown herein are intended as merely illustrative and in no way restrictive of the present invention.

Although the present invention has been explained on the basis of synthetic plastic molded bearings only, and it is considered to be most convenient to produce these bearings with such synthetic materials, however, it will be understood, without saying, that these bearings can be formed by using other materials such as die cast metals and the like.

What is claimed is:

1. A self-contained bearing comprising an elongate bearing body having an axis and opposite ends, said body having a coaxially extending hole for receiving a shaft, said body being provided with longitudinal cavities surrounding said hole and entirely confined within said body, said cavities opening externally of said body at least at one of said ends thereof and being closed at the other end, and a ring plate engageable with said body at said at least one end thereof to close the openings of the cavities thereat, said body having axial slots extending the length of the cavities and providing communication between the cavities and said shaft hole to permit lubricant contained in the cavities to flow, in small amounts and continuously, onto the surface of a shaft in said hole.

2. A bearing which comprises bearing bodies, intermediate rings, ring covers and connecting pins, said bearing bodies being provided with cavities around a center shaft hole thereof so as to contain a lubricant, said cavities opening into the shaft hole through small openings, said intermediate rings and said ring covers being provided witht small grooves at corresponding positions to said small openings of said bearing bodies, all of said bearing bodies, intermediate rings and ring covers being provided with connecting pin holes at corresponding points, said bearing bodies being combined by sandwiching said intermediate rings between adjacent bearing bodies, said connecting pins being inserted into said connecting pin holes, and the both sides of the thus combined bearing bodies being covered by said ring covers.

3. A bearing as claimed in claim 2, comprising an outer sleeve, the outer peripheral sides of said cavities being open and the combined bearing being held in said outer sleeve.

References Cited

UNITED STATES PATENTS

| 3,131,977 | 5/1964 | Wirtz | 308—240 |
| 2,964,363 | 12/1960 | Paykin et al. | 308—240 |
| 2,307,874 | 1/1943 | Bilde. | |
| 2,549,659 | 4/1951 | Brendel | 308—240 |
| 1,810,296 | 6/1931 | Souer | 308—121 |

FOREIGN PATENTS

| 284,654 | 8/1928 | Great Britain. |

MARTIN P. SCHWADRON, Primary Examiner

F. SUSKO, Assistant Examiner